United States Patent
Schmidt et al.

(10) Patent No.: US 6,262,517 B1
(45) Date of Patent: Jul. 17, 2001

(54) PRESSURE RESISTANT PIEZOELECTRIC ACOUSTIC SENSOR

(75) Inventors: Gerald E. Schmidt, Chelmsford; Leslie J. Bowen, Concord, both of MA (US)

(73) Assignee: Materials Systems, Inc., Littleton, MA (US)

( * ) Notice: Subject to any disclaimer, the term of this patent is extended or adjusted under 35 U.S.C. 154(b) by 0 days.

(21) Appl. No.: 09/502,584

(22) Filed: Feb. 11, 2000

(51) Int. Cl.[7] .............................. H01L 41/04; H01L 41/08; H01L 41/18; H02N 2/00
(52) U.S. Cl. ............................................................ 310/334
(58) Field of Search ................................ 310/334, 358, 310/337; 439/66, 278

(56) References Cited

U.S. PATENT DOCUMENTS

| | | | |
|---|---|---|---|
| 4,420,826 | * 12/1983 | Marshall, Jr. et al. | 367/167 |
| 4,845,687 | * 7/1989 | Bromfield | 367/158 |
| 5,030,873 | * 7/1991 | Owen | 310/337 |
| 5,030,874 | * 7/1991 | Saito et al. | 310/334 |
| 5,340,510 | 8/1994 | Bowen | 264/22 |
| 5,363,346 | * 11/1994 | Maltby | 367/163 |
| 5,691,960 | 11/1997 | Gentilman et al. | 367/155 |
| 5,796,207 | * 8/1998 | Safari et al. | 310/358 |
| 6,051,910 | * 4/2000 | Kaida et al. | 310/320 |

\* cited by examiner

*Primary Examiner*—Brian Sircus
*Assistant Examiner*—Michael C. Zarroli
(74) *Attorney, Agent, or Firm*—Pearson & Pearson LLP

(57) ABSTRACT

A piezoelectric acoustic sensor including stress-transferring arches to protect the elements at the lateral side surfaces. An array of parallel rod-like or blade-shaped elements is formed from a dense, poled, strongly piezoelectric or electrostrictive ceramic material. The array is encapsulated in a matrix, e.g., a polymeric matrix, to form a two-phase ceramic/polymer composite body exhibiting 1-3 or 2-2 connectivity. The upper and lower ends of the elements are exposed at upper and lower planar surfaces of the composite body to electrically contact upper and lower electrodes. A stiff portion, e.g., a face plate, extends across each of the upper and lower electroded surfaces, each extending to the edge surfaces of the composite body. A convex-shaped, stress-transferring arch is rigidly anchored to at least one edge of each stiff portion. Hinge portions of each arch at the edges of the stiff portions has a thickness of 0–10 mm. The arches are formed of a material having a stiffness of at least Shore D 80, and are shaped and disposed to direct ambient lateral stress toward the stiff portions, decoupling the ceramic elements from ambient lateral stress and forming a stress resistant piezoelectric acoustic sensor.

11 Claims, 4 Drawing Sheets

PRESSURE RESISTANT PIEZOELECTRIC ACOUSTIC SENSOR

CROSS-REFERENCE TO RELATED APPLICATIONS

The present application contains subject matter related to U.S. Pat. No. 5,340,510, issued Aug. 23, 1994 to Leslie J. Bowen and incorporated herein by reference.

BACKGROUND OF THE INVENTION

The present invention relates to piezoelectric sensors, and particularly relates to piezocomposite acoustic sensors having a so-called 1-3 or 2-2 connectivity.

Typical 1-3 and 2-2 type piezocomposite acoustic devices are described in above-reference U.S. Pat. No. 5,340,510. In the 1-3 device, a one-dimensionally connected ceramic phase, i.e., an array of parallel rods, fibers, or other one-dimensionally extending fine ceramic elements is contained within a three-dimensionally connected polymer matrix. In the 2-2 device, a two-dimensionally connected ceramic phase, i.e., an array of parallel blades or plates is laminated with layers of a two-dimensionally connected polymer matrix. In either type of device, the ends of the elements are exposed at opposing planar surfaces of the ceramic/polymer composite. Typically, the electrodes are applied to these opposing planar surfaces. The ceramic phase is poled along the length ($d_{33}$) direction of the ceramic elements, i.e., between the opposing, electroded, planar surfaces. To optimize the sensitivity of the devices, it is necessary to decouple the piezoelectric $d_{33}$ and $d_{31}$ coefficients, i.e., to minimize the effect of the acoustic vibration on the sides of the rods or blades.

In the field of piezocomposite sensors, it is well known that the sensitivity of the sensor is often highly dependent on the ambient pressure surrounding the sensor. This is particularly apparent at high pressures of up to 10,000 psi (about 70 MPa) or higher, e.g., in deep underwater hydrophone applications. Such high pressure applications have created a trade-off between sensitivity, on the one hand, and stability and robustness, on the other, of prior art devices. Increasing the pressure on the devices has resulted in a loss of sensitivity and, frequently, damage to the devices. Increasing the stability of the device, to decrease damage due to ambient pressure, has also decreased the sensitivity of the prior art devices. Additionally, minimization or optimization of the size and weight of the devices for certain applications must be balanced against the need for robustness in the devices.

Accordingly, it is an object of the present invention to provide a piezoelectric acoustic sensor which overcomes the disadvantages of the prior art.

It is another object of the invention to provide a piezoelectric acoustic sensor with high sensitivity and high robustness.

SUMMARY OF THE INVENTION

In accordance with these objects, the invention is a piezoelectric acoustic sensor including an array of parallel rod-like or blade-shaped ceramic elements encapsulated in a polymeric matrix to form a two-phase ceramic/polymer composite body exhibiting 1-3 or 2-2 connectivity. The ceramic elements are formed from a dense, poled, strongly piezoelectric or electrostrictive ceramic material. The composite body has upper and lower planar surfaces and at least four edge surfaces, upper and lower ends of the elements being exposed at the planar surfaces. Upper and lower electrodes at the upper and lower planar surfaces, respectively, have electrical contact with upper and lower ends of the elements, respectively, forming a composite body having upper and lower planar electroded surfaces. The electroded composite body includes a stiff portion, e.g., a cover plate, which may or may not provide one of the electrodes, extending across each of its upper and lower electroded surfaces, each of the stiff portions extends to the edge surfaces of the electroded composite body.

A stress-transferring arch, having a convex shape, is rigidly anchored to at least one edge of each stiff portion. A hinge portion of the arch, at the stiff portion edge, has a thickness of 0–10 mm. The arch is formed of a material having a stiffness of at least Shore D 80. The arch is shaped and disposed to direct ambient lateral stress toward the stiff portions, decoupling the ceramic elements from the ambient lateral stress and forming a stress resistant piezoelectric acoustic sensor. In a narrower embodiment, the strongly piezoelectric or electrostrictive ceramic material is a lead zirconate titanate or a derivative thereof.

BRIEF DESCRIPTION OF THE DRAWINGS

For a better understanding of the present invention, together with other objects, features, advantages, and capabilities thereof, reference is made to the following Description and appended claims, together with the Drawing in which:

DETAILED DESCRIPTION OF THE PREFERRED EMBODIMENTS

Figure 1:
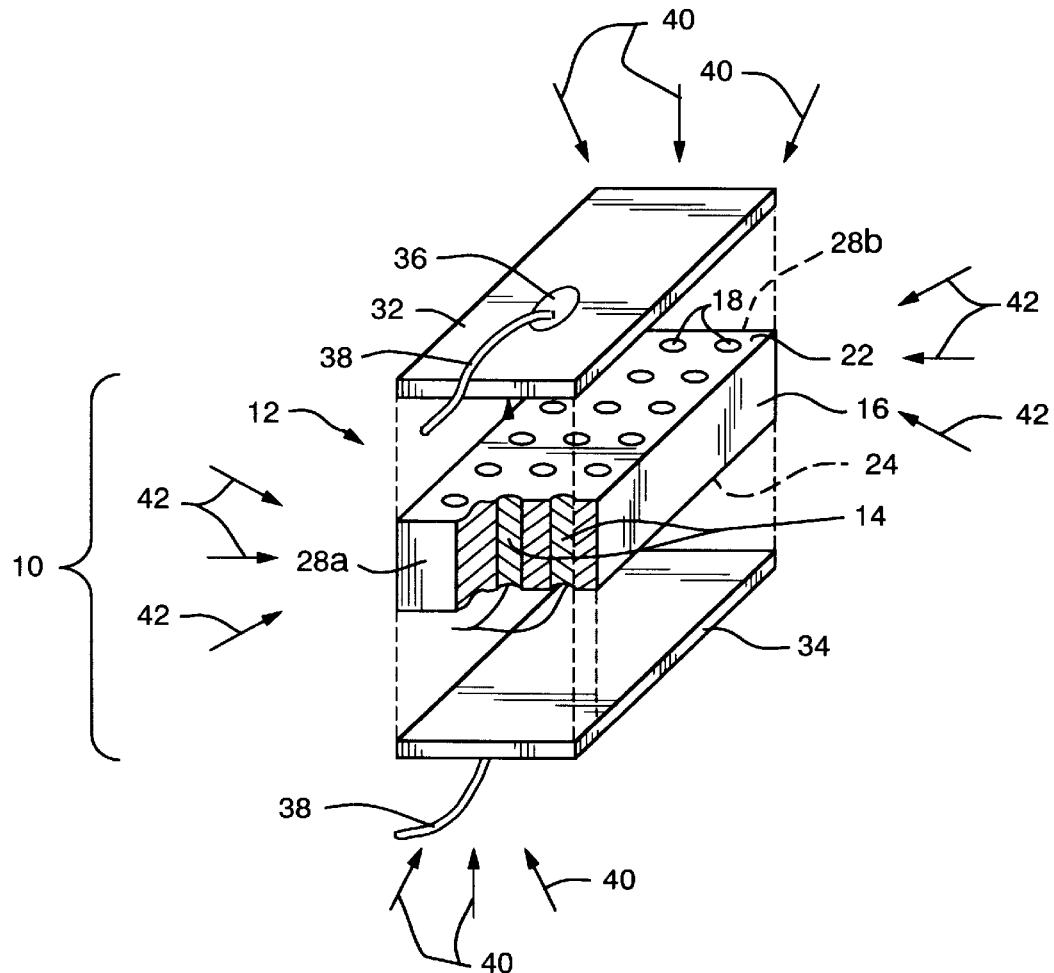
FIG. 1 is an exploded perspective view of the electroded composite body portion, partly in section, of a 1-3 type sensor in accordance with one embodiment of the present invention.

The stress-resistant piezoelectric acoustic sensor described herein includes a two-phase 1-3 or 2-2 type ceramic/polymer composite body formed from an array of parallel rod-like or blade-like elements encapsulated in a polymeric matrix. The elements are formed from a dense, preferably fully dense (at least 95% of theoretical density), piezoelectric ceramic material, are exposed at upper and lower planar surfaces of the two-phase composite body, and are poled along their length, i.e., from one exposed end to the other of each element.

The term "piezoelectric material", as used herein, is intended to mean any of the strongly piezoelectric or electrostrictive materials. The specific material described herein is a lead zirconate titanate (PZT). Alternatively, the elements may be fabricated from another piezoelectric or electrostrictive material including, but not limited to, lead magnesium niobate; lead zinc niobate; lead nickel niobate; or other titanates, tungstates, zirconates, or niobates of lead, barium, bismuth or strontium; or combinations or derivatives thereof.

The sensor includes stiff face plates covering the top and bottom planar surfaces of the composite body, with a thin electrically conductive layer between each face plate and its associated composite body planar surface. The electrically conductive layers make electrical contact with the element upper and lower ends to provide upper and lower electrodes for the sensor. Alternatively, the face plates themselves may be conductive, eliminating the need for a separate conductive layer. Also alternatively, the applied face plates may be replaced by stiff portions of the matrix itself, which provide integral face plates, as described in U.S. Pat. No. 5,691,960, incorporated by reference herein. The thin conductive layer would then be applied to the composite body planar surfaces to cover the integral face plates and the exposed element ends. In each of these embodiments, the face plates provide stiff portions of the electroded composite body to enhance the sensitivity of the piezoelectric device by transferring ambient stress from the medium in which the sensor is used preferentially onto the ends of the ceramic elements.

To protect the sides of the electroded composite body not covered by the face plates from ambient lateral stress, the sensor also includes stiff stress-transferring arches, e.g., of a stiff polymeric material or other stiff material, rigidly bonded to at least one edge of each face plate. Each arch directs ambient lateral stress toward the face plates and decouples the ceramic elements from the stress.

The description below of various illustrative embodiments shown in the Drawings is not intended to limit the scope of the present invention, but merely to be illustrative and representative thereof.

Referring now to FIG. 1, prior art electroded composite transducer 10 includes 1-3 configured composite body 12 having a two-dimensional array of rod-shaped PZT piezoelectric elements 14 encapsulated in soft polymeric matrix 16. Polymeric matrix 16 preferably is a soft, compressible material to increase the sensitivity of the device. Upper ends 18 and lower ends 20 of elements 14 are exposed at upper and lower planar surfaces 22 and 24, respectively, of composite body 12. Composite body 12 also includes lengthwise side surfaces 26a and 26b and crosswise side surfaces 28a and 28b.

Transducer 10 also includes upper and lower electrically conductive, stiff face plates 32 and 34, respectively. Conductive face plates 32 and 34 are in electrical contact with element ends 18 and 20, respectively, providing upper and lower electrodes to drive the transducer. Electrical contacts 36 (only one is shown) and leads 38 connect the electrodes to an electronic signal receiving means. Face plates 32 and 34 provide a stiff portion of the electroded body to protect the upper and lower surfaces of the electroded composite body, particularly the ends of the ceramic elements, from ambient stress, represented by arrows 40, e.g., from water pressure in a deep sea environment. However, there is no protection from ambient stress at sides 26a, 26b, 28a, and 28b of the composite body, represented by arrows 42, unless a stiff matrix is used between the ceramic elements. As mentioned above, such a stiff matrix significantly lowers the sensitivity of the sensor.

Figure 2:
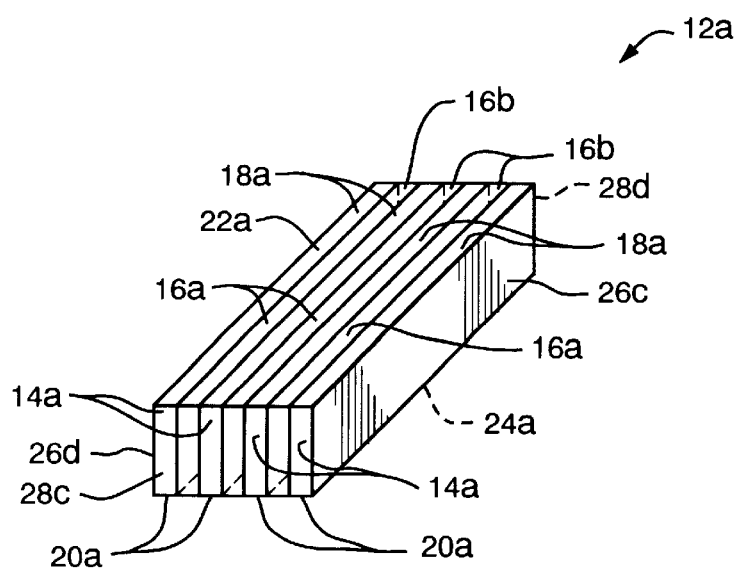
FIG. 2 is a perspective view of the composite body portion of an alternate, 2-2 type embodiment of a sensor in accordance with the present invention.

FIG. 2 shows a prior art composite body similar to that shown in FIG. 1. Throughout the Figures, similar features to those shown in other Figures will be indicated by the same reference numerals. In FIG. 2, 2-2 configured composite body 12a includes a two-dimensional array of blade-shaped PZT piezoelectric elements 14a encapsulated in soft polymeric matrix 16a, so that blades 14a alternate with layers 16b of matrix 16a in a laminated arrangement to form the 2-2 configuration of the composite body. Upper ends 18a and lower ends 20a of elements 14a are exposed at upper and lower planar surfaces 22a and 24a, respectively, of composite body 12a in a manner similar to that shown for composite body 12 of FIG. 1. Planar surfaces 22a and 22b of composite body 12a are electroded with upper and lower electrically conductive, stiff face plates (not shown) and electrically connected to an electronic signal receiving means in a manner similar to that shown in FIG. 1 to form a composite transducer.

Alternately, in either composite transducer described above, the electrodes may be provided by an electrically conductive coating on the upper and lower surfaces of the composite body, and a separate, non-conductive stiff face plate bonded to the upper and lower surfaces of the thus electroded body. Such an electroding configuration is shown in FIGS. 3–8. The electrical contacts and leads then are attached to the electrode layers in known manner to provide electrical connection to an electronic signal receiving means. The composite bodies and transducers of FIGS. 1 and 2 are similar to those described in above-referenced U.S. Pat. No. 5,340,510.

Figure 3:
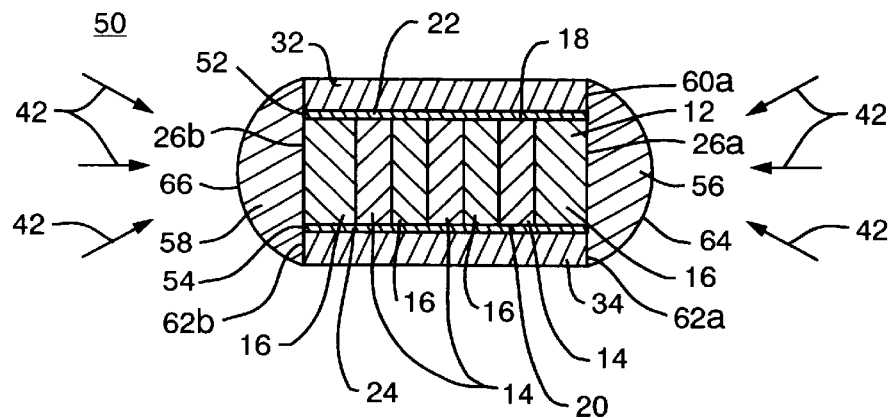
FIGS. 3–8 are cross-sectional elevation views of sensors in accordance with the invention, including various embodiments of stress-transferring arches.

FIG. 3 illustrates one embodiment of a novel means for protecting the side surfaces of the sensors described above when a soft matrix is used to achieve high sensitivity in the sensor. Sensor 50 includes 1-3 type composite body 12 having elements 14 and matrix 16. Electrically conductive layers 52 and 54 are deposited on composite body 12 beneath stiff face plates 32 and 34, respectively, to form an electroded composite transducer. Composite body side surfaces 26a and 26b are covered with convex-shaped, stress-transferring arches 56 and 58, respectively. Stress-transferring arch 56 is rigidly anchored, e.g., bonded to edges 60a and 62a of face plates 32 and 34, respectively, while stress-transferring arch 58 is rigidly anchored, e.g., bonded to edges 60b and 62b of face plates 32 and 34, respectively.

The material of the arches is selected to be sufficiently stiff to provide side-stress protection to the composite body by redirecting or transferring side stress, represented by arrows 42, impinging on arch outer surfaces 64 and 66 to face plate edges 60a, 60b, 62a, and 62b. Suitable arch materials include thermosetting and thermoplastic polymers of a stiffness of at least Shore D 80, such as polyurethanes, epoxy resins, their admixtures, polycarbonates, and reinforced polymers, for example, those reinforced with glass fibers or other reinforcing means.

The convex shape and positioning of arches 56 and 58 relative to the edges of the face plate is critical to the transfer of the ambient stress to the stiff face plates, i.e., to direct ambient side stress toward the face plate edges and away from the vulnerable matrix and ceramic elements. The stress is transferred through the arches in a manner similar to the stress transferring characteristics of architectural arches. The arches must be bonded to and supported by the edges of the face plate and spaced from the ceramic elements. Further, the convex shape of each arch provides a thicker central portion to better protect the device from side stress and thinner edges bonded to the face plates to permit the face plates to be compressed together. The thickness of the central portion of each of the arches is dependent on the geometry of the composite body and the arch material, and must be sufficiently large to effectively prevent the ambient stress from being applied to the ceramic elements. (This central arch thickness is readily determined empirically.) Thus, ambient stress applied to the outer, convex surfaces of the arches is transferred through the convex arch structure to the face plate edges without affecting the side surface of the transducer or the elements and without significantly affecting the sensitivity of the device. The use of arches to redirect stress due to gravity is well known in the architectural sciences. However, these principles have not been used to protect acoustic sensors from ambient stress such as undersea water pressure until the present invention.

The provision of arches 56 and 58 provides stress resistance to the piezoelectric acoustic sensor described herein, without affecting its sensitivity. Thus, a soft matrix may be used in the stress-resistant sensor to provide enhanced sensitivity without compromising pressure resistance, even in an environment of high ambient stress, e.g, deep underwater hydrophone applications.

The stress-transferring arches may be applied to a known 1-3 electroded composite body by conventional encapsulation methods, for example, by potting, thermoplastic overmolding, casting, injection molding, or compression molding, or by gluing or welding preformed arches into place.

In operation, acoustic sensor 50 including novel stress-transferring arches 56 and 58 is connected by leads (not shown in FIG. 3, but similar to leads 38 of FIG. 1) to an electronic signal receiving means. The sensor is then placed in the environment in which it is to be utilized (e.g., in an underwater hydrophone apparatus where high sensitivity and high water pressure resistance is critical to the accuracy and longevity of the device). Ambient pressure at the sides of the device is redirected toward the stiff face plates, decoupling the stress from and protecting the ceramic elements.

Figure 4:
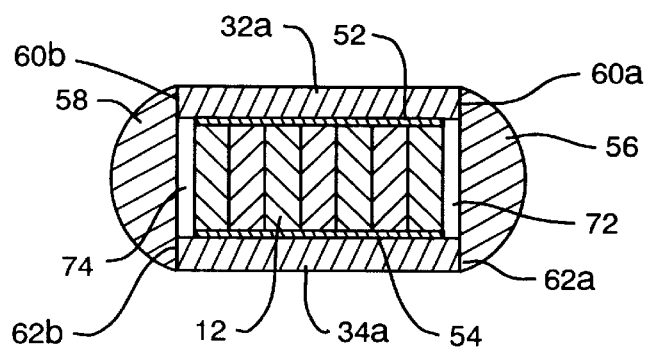

Alternate embodiments of the acoustic sensor are shown in FIGS. 4–8. In FIG. 4, acoustic sensor 70 includes composite body 12 and electrodes 52 and 54. Face plates 32a and 34a are similar to face plates 32 and 34 of FIG. 3, but extend beyond the sides of composite body 12 and electrodes 52 and 54, creating void spaces 72 and 74. Stress-transferring arches 56 and 58 are bonded to face plate edges 60a, 60b, 62a, and 62b, as described above, enclosing void spaces 72 and 74 and further decoupling composite body 12 from the ambient lateral stress.

Figure 5:
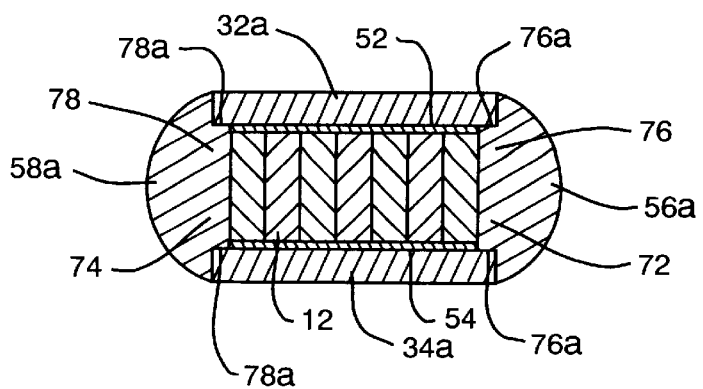

FIG. 5 shows acoustic sensor 70a, similar to sensor 70 of FIG. 4, and having the same electroded composite body and face plates 32a and 32b extending beyond the electroded body. Stress-transferring arches 56a and 56b, however, include protrusions 76 and 78 extending partly or fully into void spaces 72 and 74. Protrusions 76 and 78 provide additional surface area at protrusion side surfaces 76a and 78a for rigidly anchoring arches 56a and 58a to face plates 32a and 34a.

Figure 6:
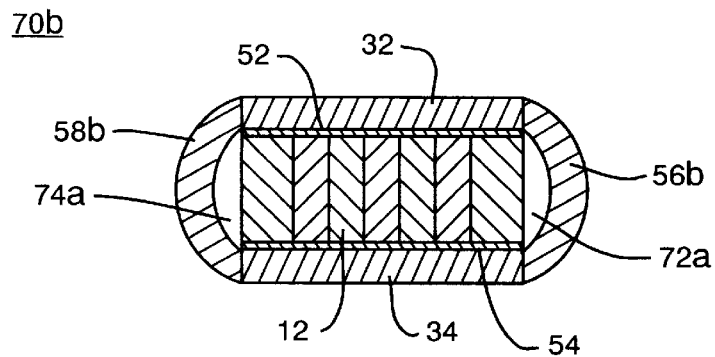

FIG. 6 shows acoustic sensor 70b, having the same electroded composite body and face plates 32 and 34 as sensor 50 of FIG. 3. Void spaces 72a and 74a are provided by stress-transferring arches 56b and 56b, further decoupling composite body 12 from the ambient lateral stress in a manner similar to that described for sensor 70 of FIG. 4.

Figure 7:
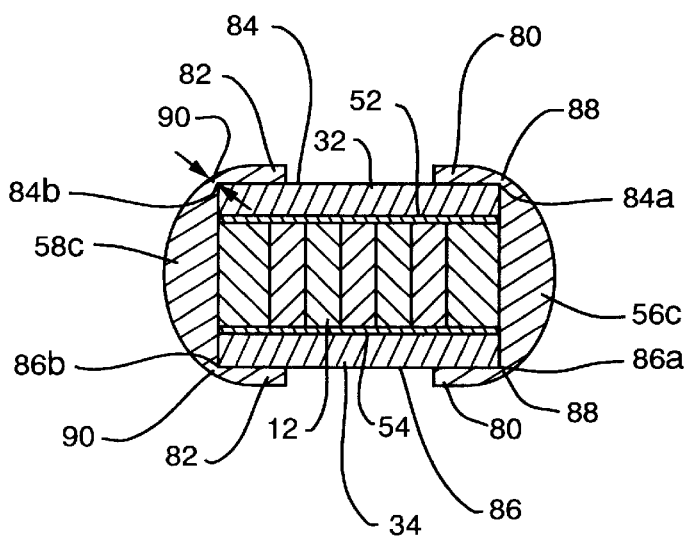

FIG. 7 shows acoustic sensor 50a, similar to sensor 50 of FIG. 3, and having the same electroded composite body and face plates 32 and 34. Stress-transferring arches 56c and 58c, however, include extensions 80 and 82, respectively, which overlap and are rigidly anchored to cover plate outer surfaces 84 and 86, e.g., by bonding. Extensions 80 and 82 provide additional surface area for rigidly anchoring arches 56c and 58c to face plates 32 and 34. Arch extensions 80 and 82, thus, cover corners 84a and 86a of face plate outer surfaces 84 and 86, respectively, providing hinge portions 88 and 90 of arches 56c and 58c, respectively.

To protect the stress-transferring capabilities of arches 54 and 56, it is important that hinge portions 88 and 90 are no more than 10 mm thick, and preferably are no more that 3 mm thick. (Since arches 56, 58, 56a, 58a, 56b, and 58b have no extensions, their hinge thicknesses are effectively zero.)

Figure 8:
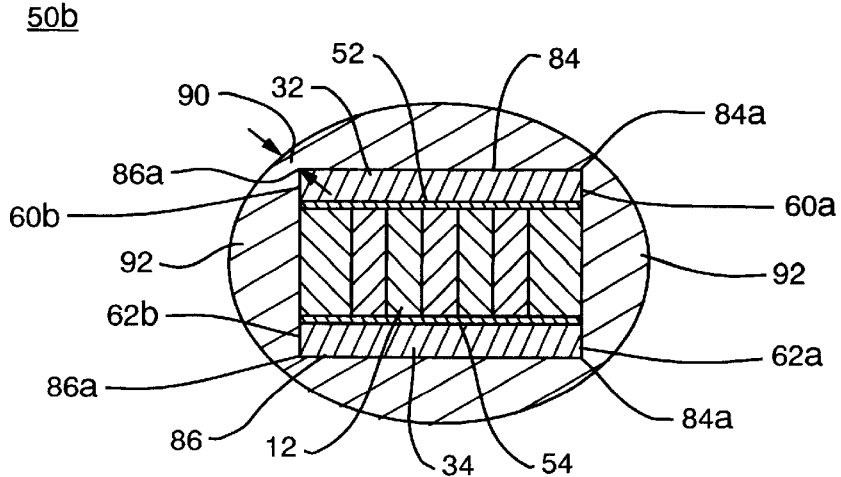

FIG. 8 shows acoustic sensor 50b, similar to sensor 50a of FIG. 7, and having the same electroded composite body and face plates 32 and 34. The stress-transferring arches and extensions, however, are part of unitary arch structure 92 which extends over face plates 32 and 34 to completely cover face plate outer surfaces 84 and 86. Arch structure 92 is rigidly anchored to cover plate edges 60a, 60b, 62a, and 62b and to face plate outer surfaces 84 and 86. Thus, additional surface area is provide for rigidly anchoring arches 56c and 58c to face plates 32 and 32. Arch structure 92 covers corners 84a and 86a of face plate outer surfaces 84 and 86, respectively, providing hinge portions, as 90, as described above. As also described above, to protect the stress-transferring capabilities of arch structure 92, the hinge portions are no more than 10 mm, and preferably no more than 3 mm thick.

Figure 9:
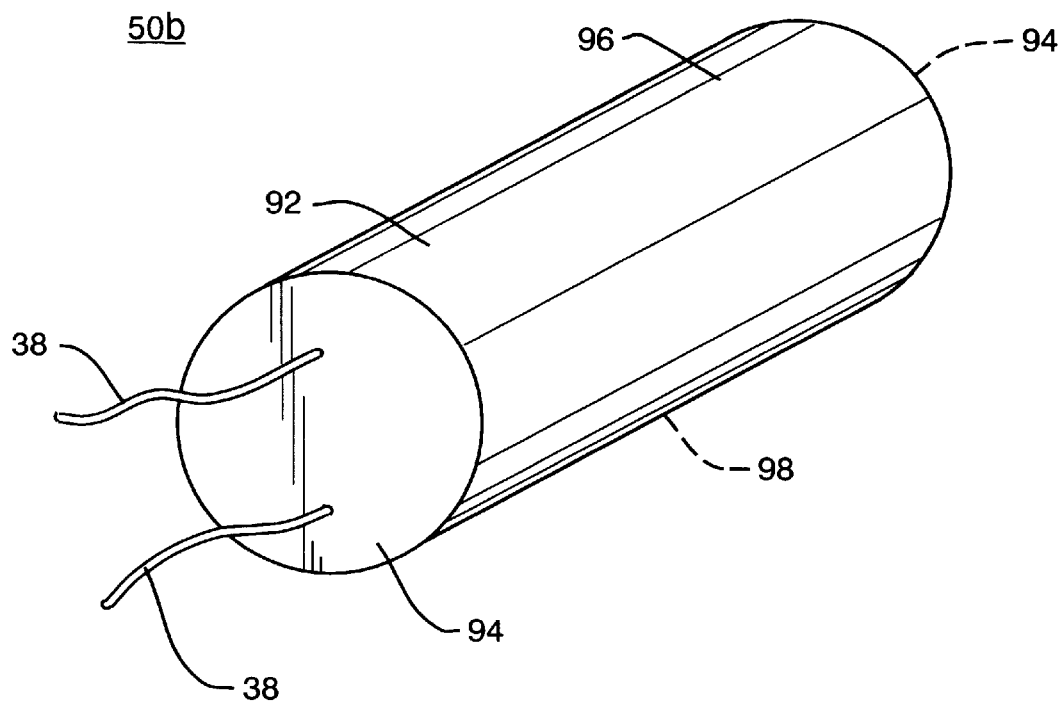
FIG. 9 is a perspective view of the sensor of FIG. 8, showing typical electrical wiring.

FIG. 9 shows acoustic sensor 50b of FIG. 8 in perspective. As shown, the lengthwise sides of sensor 50b are protected by the arched portions of unitary stress-transfer-ring arch structure 92. The crosswise sides of the sensor are also covered by structure 92, but structure end portions 94 covering the crosswise sides have flat, rather than arched, surfaces. This configuration allows for simpler fabrication techniques, while providing adequate protection in environments where the lengthwise sides of the device are subjected to more rigorous conditions that the crosswise sides, e.g., where several of the acoustic sensors are aligned end to end. Alternatively, the crosswise sides may be protected by arches similar to those protecting the lengthwise sides of the sensor. Sensor 50b is shown with rounded upper and lower structure portions 96 and 98 covering the face plates. Alternatively, upper and lower structure portions 96 and 98 may have a flat configuration.

Figure 10:
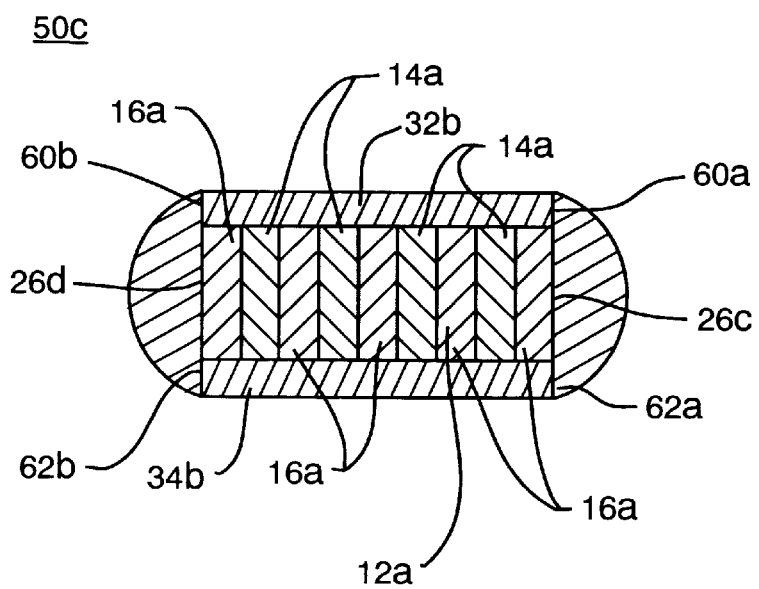
FIG. 10 is a cross-sectional view of a sensor in accordance with the invention, similar to that of FIG. 3 but substituting a 2-2 type composite body for the 3-3 type composite body of FIG. 3.

Alternatively, the sensors of any of FIGS. 3–9 may include a 2-2 type composite body, as composite body 12a of FIG. 2, instead of 1-3 type composite body 12. Such a sensor is shown in FIG. 10, in which sensor 50c includes 2-2 type composite body 12a having elements 14a and matrix 16a divided into matrix layers 16b. As shown in FIG. 10, the outermost layers of the composite body are matrix layers 16a. Electrically conductive stiff face plates 32a and 34a, respectively, are bonded to upper and lower surfaces of composite body 12a to form an electroded composite transducer. Composite body side surfaces 26c and 26d are covered with convex-shaped, stress-transferring arches 56 and 58, respectively. Stress-transferring arch 56 is rigidly anchored, e.g., bonded to edges 60a and 62a of face plates 32b and 34b, respectively, while stress-transferring arch 58 is rigidly anchored, e.g., bonded to edges 60b and 62b of face plates 32b and 34b, respectively.

As mentioned above, the stress-transferring arches and arch structure described above may be applied to a known 1-3 or 2-2 type electroded composite body by conventional encapsulation methods, for example, potting, thermoplastic overmolding, casting, injection molding, or compression molding, or by gluing or welding preformed arches into place.

In operation, any of the acoustic sensors described herein, including the novel stress-transferring arches, are connected by leads (as shown in FIGS. 1 and 9) to an electronic signal receiving means. The sensor is then placed in the environment in which it is to be utilized (e.g., in an underwater hydrophone apparatus where high sensitivity and high water pressure resistance is critical to the accuracy and longevity of the device). Ambient pressure at the sides of the device is redirected toward the stiff face plates, decoupling the stress from and protecting the ceramic elements.

The following Examples are presented to enable those skilled in the art to more clearly understand and practice the present invention. These Examples should not be considered as a limitation upon the scope of the present invention, but merely as being illustrative and representative thereof.

EXAMPLE

Two 1-3 type hydrophones were constructed having a construction similar to that shown in FIG. 1. One of these hydrophones was encapsulated to form an arch structure having a circular cross-section similar to that shown in FIG. 9. The encapsulated hydrophone cylinder was 0.44 inches in diameter and 1.05 inches long. For each hydrophone, 90 PZT-5H piezoelectric ceramic rods, about 0.5 mm in diameter, 4 mm long, and spaced 1 mm from one another, were embedded in a Shore A 60 matrix, including 10 µm hollow polymer spheres at 2.5% by weight, to form a composite body 6 mm wide, 22 mm long, and 4 mm high. Glass reinforced epoxy (FR4) electrically conductive face plates 750 µm thick were bonded to the upper and lower surfaces of the composite body, making electrically conductive contact with the ceramic elements. After wiring, one of the hydrophone assemblies was encapsulated in a cylindrical shell of hard (above Shore D 90) epoxy including 2.5% by weight of 10 µm hollow polymer spheres, forming stress-transferring arches at the longitudinal side surfaces having hinges about 1500 µm thick. The sensitivities (free field voltage sensitivity, FFVS) of the two hydrophones are compared in Table I.

TABLE I

| Hydrophone description | FFVS, dB re 1V/µPa | |
| --- | --- | --- |
| | before encapsulation | Change in operation from 0–1000 psi |
| no arches | −199.0 | −14.0dB |
| with arches | −199.0 | −0.6dB |

As shown in Table I, the addition of stress-transferring arches provides a significantly improved hydrophone with little loss in sensitivity during high pressure operation.

The invention described herein presents to the art novel, improved acoustic sensors having improved robustness and high sensitivity. The sensors are readily fabricated by conventional means, lowering the fabrication cost. The acoustic sensors are especially suitable for operation under severe ambient stress conditions, e.g., undersea hydrophone applications such as seismic exploration, oil and gas field monitoring, and the like.

While there has been shown and described what are at present considered the preferred embodiments of the invention, it will be apparent to those skilled in the art that modifications and changes can be made therein without departing from the scope of the present invention as defined by the appended claims.

We claim:

1. A piezoelectric acoustic sensor comprising:
   an array of parallel rod-like or blade-shaped elements formed from a dense, poled, strongly piezoelectric or electrostrictive ceramic material;
   a polymeric matrix encapsulating said array to form a two-phase ceramic/polymer composite body exhibiting 1-3 or 2-2 connectivity and having upper and lower planar surfaces and at least four edge surfaces, upper and lower ends of said elements being exposed at said planar surfaces;
   upper and lower electrodes at said upper and lower planar surfaces, respectively, and having electrical contact with upper and lower ends of said elements, respectively, forming composite body having upper and lower planar electroded surfaces;
   wherein said electroded composite body includes a stiff portion extending across each of its upper and lower electroded surfaces, each of said stiff portions extending to said edge surfaces;
   a stress-transferring arch, having a convex shape, rigidly anchored to at least one edge of each of said stiff portions, wherein a hinge portion of said arch at said stiff portion edge has a thickness of 0–10 mm, said arch is formed of a material having a stiffness of at least Shore D 80, and said arch is shaped and disposed to direct ambient lateral stress toward said stiff portions, decoupling said ceramic elements from said ambient lateral stress and forming a stress resistant piezoelectric acoustic sensor.

2. A piezoelectric acoustic sensor in accordance with claim 1 wherein said strongly piezoelectric or electrostrictive ceramic material is a lead zirconate titanate or a derivative thereof.

3. A piezoelectric acoustic sensor in accordance with claim 1 wherein said stiff portions comprise an upper and a lower cover plate applied to said upper and lower planar surfaces, respectively.

4. A piezoelectric acoustic sensor in accordance with claim 3 wherein at least a portion of each of said upper and lower cover plates is electrically conductive and provides one of said upper and lower electrodes.

5. A piezoelectric acoustic sensor in accordance with claim 3 wherein each of said cover plates extends outwardly beyond said polymeric matrix toward an associated one of said arches, creating a void space between said matrix and each of said arches; and each of said arches is rigidly anchored to an inner surface of each of said cover plates.

6. A piezoelectric acoustic sensor in accordance with claim 5 wherein each of said arches includes a protrusion extending at least part way into an associated one of said void spaces.

7. A piezoelectric acoustic sensor in accordance with claim 3 wherein upper and lower portions of said arches are rigidly anchored to and overlap outer surfaces of said cover plates; each of said cover plates includes edge portions each having upper and lower corners; and each of said arches include portions covering said corners, each of said corner-covering portions providing one of said hinges.

8. A piezoelectric acoustic sensor in accordance with claim 7 wherein overlapping portions of said arches are joined to one another, covering said cover plate outer surfaces and encapsulating said electroded composite body.

9. A piezoelectric acoustic sensor in accordance with claim 8 wherein said arches include fibers of an orientation and sufficient length to wrap around said electroded composite body.

10. A piezoelectric acoustic sensor in accordance with claim 1 wherein an inner surface of each of said arches is a concave surface, creating a void space between said matrix and each of said arches.

11. A piezoelectric acoustic sensor comprising:

an array of parallel rod-like elements formed from a dense, poled, strongly piezoelectric or electrostrictive ceramic material;

a polymeric matrix encapsulating said array to form a two-phase ceramic/polymer composite body exhibiting 1-3 connectivity and having upper and lower planar surfaces and at least four edge surfaces;

upper and lower electrodes at said upper and lower planar surfaces, respectively, and having electrical contact with upper and lower ends of said elements, respectively, forming an electroded composite body having upper and lower planar electroded surfaces;

wherein said electroded composite body includes a cover plate extending across each of its upper and lower electroded surfaces, and wherein each of said cover plates extends to said composite body edge surfaces and includes edge portions each having upper and lower corners;

a stress-transferring portion encapsulating said electroded composite body, said stress-transferring portion including stress-transferring arches rigidly anchored to at least two edge surfaces of each of said cover plates;

wherein each of said arches is formed of a stiff polymeric material; each of said stress-transferring portions includes portions covering said cover plate corners, said corner-covering portions being no greater than 10 mm thick; and each of said arches is shaped and disposed to direct ambient lateral stress toward said cover plate edge surfaces, decoupling said ceramic elements from said ambient lateral stress and forming a stress resistant piezoelectric acoustic sensor.

* * * * *